United States Patent Office 3,598,618
Patented Aug. 10, 1971

3,598,618
MAGNESIA BEARING POROUS GRAINS
AND BODIES
Kinjiro Fujii, Yoshihiko Ishido, and Akihiro Motoe, Tokyo, Japan, assignors to Agency of Industrial Science & Technology Ministry of International Trade and Industry, Tokyo, Japan
No Drawing. Continuation-in-part of abandoned application Ser. No. 688,316, Dec. 6, 1967. This application Feb. 8, 1968, Ser. No. 703,896
Int. Cl. C04b 33/00
U.S. Cl. 106—40       5 Claims

ABSTRACT OF THE DISCLOSURE

A small amount of strong acetic acid reacts with magnesia or magnesium hydroxide to form stronly coherent porous grains or pellets which, after being moistened with a small amount of water, can be shaped with or without addition of refractory fillers and fired into porous magnesia bodies. A slurry prepared from magnesia or magnesium hydroxide, acetic acid, a small amount of water and chemical foaming agent solidifies within a few minutes into a porous body which can be fired to produce magnesia bricks lighter than water.

REFERENCE TO RELATED APPLICATION

This is a continuation-in-part of our copending application Ser. No. 688,316, filed Dec. 6, 1967, now abandoned.

BACKGROUND OF THE INVENTION

This invention relates to magnesia bearing porous materials, and particularly to magnesia-bearing, shaped refractory bodies.

Magnesia is commonly employed as a basic refractory material in the form of bricks and the like. Another use, would be heat insulating refractories, for which several production methods have been proposed, but they haven't reached the stage of practical use.

The reason for the above lies in the fact that an effective forming method has not yet been found. For example, petroleum coke powder and bituminous binder are mixed with magnesia powder and then formed under pressure and fired, but in this method the formed bodies may be easily damaged at the time when the combustible materials burn out. In the forming method using Sorel cement in which magnesium sulfate and magnesium chloride are mixed as a binder, firing shrinkage of the shaped green body is generally large, and the fumes of sulfur oxides and chlorine developed during firing are corrosive.

The object of the invention is a shaping method for magnesia or magnesium hydoxide which relies on an organic bonding agent free from the afore-described shortcomings of bituminous binders and of Sorel cement.

SUMMARY OF THE INVENTION

It has been found that a small amount of strong or glacial acetic acid drops reacts with an excess of magnesia or magnesium hydroxide almost instantaneously to form porous grains or pellets which are strong enough to permit normal handling. After separation from the excess magnesia or magnesium hydroxide, the porous grains or pellets can be moistened with water and be compressed into shape retaining bodies, which develop excellent mechanical strength after air drying and then can be fired at the temperatures conventional in the manufacture of magnesia bricks to obtain light porous magnesia bearing bodies with very little shrinkage.

Alternatively, the acetic acid or its solution may be dispersed in magnesia or magnesium hydroxide to form a plastic slurry which can be shaped for a few minutes after it was formed, and then becomes rigid and self-supporting in the manner of Sorel cement. If an active foaming or expanding agent is present while the mass is still plastically deformable, a cellular, light body is formed.

The solidification time of a mixture of a small amount of acetic acid with a large amount of magnesia or magnesium hydroxide powder depends on the nature of the magnesium bearing powder employed and the temperature. Finely divided magnesium hydroxide powder reacts with drops of glacial acetic acid to form solid grains or pellets within two or three seconds at room temperature. Magnesia powder prepared by crushing and grinding clinkers fired at very high temperature reacts so slowly at room temperature that it is more practical to heat its mixture with acetic acid.

The particle size of the green, porous, magnesia bearing material obtained depends mainly on the degree of dispersion of the liquid medium containing the acetic acid during contact with the powder. If glacial acetic acid or an aqueous solution containing at least 40 percent acetic acid is sprayed on a bed of moving magnesia or magnesium hydroxide powder, variations in the nozzle size, air pressure, and in similar characteristics of an air-operated spray gun permit the average size of the grains or pellets formed to be controlled between 0.5 mm. and 5 mm.

The powder used in this invention can be a mixture of magnesia or magnesium hydroxide with another pulverized oxide such as silica, alumina, clay, zirconia, titania, chromite and iron oxide, or carbonate such as calcite and dolomite, or various carbides, and nitrides or a mixture of the above substances. Substances inert to acetic acid under the conditions of this method, may be present in the green porous grains or pellets when magnesia or magnesium hydroxide is contained in an amount of 20% or even 10% of the weight of the whole mixed powder. Residues of such expanding or foaming agents as barium peroxide, manganese dioxide, ammonium carbonate and copper powder do not interfere with the reaction between magnesia or magnesium hydroxide and acetic acid.

Organic materials other than acetic acid may also be present in small amount, wherever necessary to introduce mold lubricants and the like. Liquid aliphatic hydrocarbons, benzene, toluene, lower alkanols, ethers, and ketones may be present in the acetic acid, and the acid may contain formic or propanoic acid, and even mineral acids, such as sulfuric or hydrochloric acid, which do not interfere with the desired reaction.

Hydrogen peroxide is a convenient expanding agent. It is activated by small amounts of heavy metal ions, and the iron chloride, copper sulfate, and similar salts incorporated in the reacting mixture for this purpose do not have a significant effect on the principal reaction. Other known expanding agents also may be employed.

If a slurry of magnesia bearing powder, acetic acid, and a small amount of water is initially prepared, it may contain organic materials for controlling the viscosity of the slurry, such as cellulose acetate.

The nature of the reaction which causes a magnesia bearing powder to agglomerate about drops of acetic acid is not fully understood at this time, but the following observations are believed to be significant. When strong sulfuric acid (50%–98%) is sprayed on a moving bed of magnesia powder obtained by comminution of magnesia clinker and maintained at 60° C., almost none of the acid is absorbed. A surface film containing the products of reaction between the magnesia and the acid may form. Liquid drops coated with a thin film of solid reaction products may also be found. When glacial acetic acid is sprayed on the same bed under otherwise identical conditions, it is quickly absorbed by the powder. A violent reaction appears to occur in each spot in which a drop was absorbed, resulting in turbulent motion of the powder and a sharp localized increase in temperature to a boiling point, and the affected material solidifies into a dried and firm grain or pellet almost instantaneously.

The air originally present between the powder particles apparently is trapped in the congealing mass and accounts for the low specific gravity of the grains or pellets. They showed approximately 20% or lower ignition loss when heated at a temperature of 1000° C. The reaction is, therefore, thought to lead to the formation of magnesium acetate which firmly bonds magnesium oxide particles and the inert particles to each other.

When the grains or pellets are heated in air to approximately 300 to 350° C., a gas containing water vapor, acetone and carbon dioxide is released. Further heating to 1500–1800° C. causes the conversion of the green material into sintered porous grains or pellets of magnesia without change in the original shape. They may be used directly as a refractory material or as light carriers for catalysts. They may also be formed into larger objects with the aid of binders, and fired again.

However, larger objects are made directly from the green porous material by mixing the same with refractory fillers, such as magnesia, chromium oxide, or clay, shaping the mixtures with a small amount of water, and firing them. The added water dissolves a portion of the magnesium acetate, and the solution acts as an excellent binder for the filler.

The rate of the reaction between the acetic acid and the magnesia bearing raw material can be controlled to some extent. If comminuted magnesia clinker is employed, the reaction rate is controlled most conveniently by choosing the reaction temperature. Inert fillers, such as alumina or zirconia, which act as diluents, also lengthen the setting time. It has also been found practical to coat the individual grains of magnesia or magnesium hydroxide with a thin film of paraffin by tumbling the grains with paraffin in a heated drum, and the coated grains react more slowly with the acetic acid which is absorbed in the film.

Mixtures of magnesia or magnesium hydroxide with water and acetic acid that have been prepared in a manner to set in a few minutes only can be shaped in molds while in the plastic condition and having the consistency of a paste or slurry. A heat responsive expanding or foaming agent, when present in the mixture, is decomposed by the heat of reaction before the mixture sets completely, and shaped porous magnesia bodies of very low bulk density are obtained by firing the green products so obtained.

DESCRIPTION OF PREFERRED EMBODIMENTS

The following examples are further illustrative of this invention, and it will be understood that the invention is not limited thereto.

Example 1

Magnesia clinker fired at 1700° C. was crushed and ground to pass a 100-mesh screen. Approximately one kilogram of the powder was placed into a cylindrical pan having a depth of 10 cm. and a bottom 30 cm. in diameter and inclined to the horizontal at an angle of about 25°. The pan was rotated about its axis at 60 r.p.m., and its contents were kept at 70° C.

Glacial acetic acid was sprayed intermittently on the surface of the moving bed of magnesia in the pan from an air-operated spray gun at a rate of 60 ml. per minute until 50 ml. of the liquid had been discharged. Wherever a droplet of acetic acid hit the surface, it appeared to boil up, and the powder in the target area congealed into an approximately spherical, firm body. Pellets having a diameter up to about 5 mm. were formed almost instantaneously.

The contents of the pan were poured on a 50-mesh screen which passed the excess magnesia, but retained 0.21 kg. of the newly formed pellets and grains. Most of the latter, when carefully sectioned and inspected with a magnifying glass, were found to have a honeycomb structure, the individual air-filled cells being separated by thin walls. They were so strong that they could not be crushed between the fingers of a hand and had a bulk density of 0.81 g./cm.$^3$. They lost 19% of their weight upon high temperature ignition, and the ignition loss is believed due entirely to the decomposition of magnesium acetate in the products. When fired at 1500° C., the grains became very strong and had a bulk density of 0.77 g./cm.$^3$.

Obviously, more or less acetic acid can be sprayed on the magnesia powder in the pan than the 50 ml. chosen in this example. However, the amount of acetic acid cannot exceed 20% unless it is desired to convert the contents of the pan into a single solid block, and the ratio of acetic acid to magnesium oxide or hydroxide in the products is preferably smaller than 20 to 80.

Example 2

The procedure of Example 1 was repeated with a dilute acetic acid aqueous solution instead of glacial acetic acid. A solution of 40% acetic acid could be used to form magnesia porous grains having a similar characteristic as the one obtained in Example 1, provided that the magnesia bed was heated to a temperature of about 200° C. by means of radiant heaters. However, a dilute acetic acid solution containing less than 40% acetic acid produced dense but weak grains and pellets under otherwise identical conditions.

Example 3

A mixture of 40% by weight of the magnesia powder described in Example 1 and 60% powdered chromite ore from Masinloe (Philippine Republic) was placed in the pan described in Example 1 and was sprayed with a mixture of 30% water, 5% concentrated (30%) hydrogen peroxide, 1% ferric chloride, and 64% glacial acetic acid, while maintained at a temperature of approximately 150° C. by means of radiant heaters.

Porous grains formed practically instantaneously as described in Example 1. They had a bulk density of 0.85 g./cm.$^3$.

Example 4

The procedure of Example 1 was repeated with 0.8 kg. magnesium hydroxide instead of the magnesia. The contents of the pan were held at 38° C. while they were sprayed with 50 ml. glacial acetic acid.

The grains obtained were smaller than those formed from magnesia in Example 1, and only 0.16 kg. of grains and small pellets were retained on a 50 mesh screen. The bulk density of the material was only 0.23 g./cm.$^3$, and its strength much lower than that of the material obtained from magnesia. However, the individual green grains or pellets retained their shape through a firing operation which greatly increased their strength.

Example 5

The green porous grains or pellets obtained in Example 1 were mixed with 10% (by weight) of the original magnesia powder, and 10% water were admixed to the material from a spray gun.

The plastic mixture was compressed in a cylindrical mold of 5 cm. diameter to a height of 6 cm., a and air dried. The compressive strength of the dry cylinder so obtained was 43 kg./cm.$^2$, and its bulk density 1.0 g./cm.$^3$. After firing at 1500° C. for one hour, there was obtained a sintered porous body consisting entirely of magnesia and having a bulk density of 0.95 g./cm.$^3$ and a compressive strength of 32 kg./cm.$^2$.

Closely similar results were obtained when the magnesia grains and pellets of Example 1 were replaced by the chromite filled particles prepared according to Example 3. The grains and pellets prepared from magnesium hydroxide as described in Example 4 yielded significantly weaker and lighter moldings.

Example 6

A relatively coarse fraction of the crushed and ground clinker referred to in Example 1 which passed a 40 mesh screen was made into a slurry by mixing 1 kg. of the material at ambient temperature (15° C.) with 5 g. amosite asbestos whose fibers did not exceed 2 cm. in length, and 450 g. of an acetic acid solution prepared from 5 parts (by weight) cellulose acetate powder, 86 parts glacial acetic acid, 8 parts 30% hydrogen peroxide solution, and 1 part ferrous chloride.

The slurry was stirred for about three minutes and was then poured into an open mold 23 cm. long, 12 cm. wide, and 10 cm. high. The slurry expanded and set within a few minutes. The strong, porous body lifted from the mold contained innumerable, small, closed cells and had a bulk density of 0.84 g./cm.$^3$. Its shrinkage during firing at 1500° C. for one hour was 5.3%, and the bulk density of the fired insulating brick obtained was 0.73 g./cm.$^3$.

The crushed clinker could be replaced in part by the chromite ore described in Example 2, and analogous results were obtained. When magnesium hydroxide was substituted for the magnesia, the reaction with acetic acid was too rapid unless the magnesium hydroxide particles were coated with paraffin, as described above.

Example 7

The procedure of Example 6 was repeated under the same conditions, but with an acetic acid solution prepared from 5 parts (by weight) cellulose acetate powder, 70 parts glacial acetic acid, 5 parts 30% hydrogen peroxide solution, 1 part ferric chloride and 19 parts water instead of the solution described in Example 6. The slurry expanded and set within about 10 minutes. The porous body removed from the mold showed a slightly plastic behaviour and was not so strong as the one obtained in Example 6. When dried at 110° C., however, the body become strong and had a bulk density of 0.91 g./cm.$^3$.

It should be understood, of course, that the invention is not limited to the specific embodiments described hereinabove, but is to be construed broadly and restricted solely by the scope of the appended claims.

What is claimed is:
1. A method of producing a magnesia bearing porous material which comprises:
   (a) dividing a liquid medium essentially consisting of 40 to 100 parts of glacial acetic acid and 60 to 0 parts of water into a multiplicity of drop;
   (b) contacting each drop with a powder essentially consisting of magnesia or magnesium hydroxide in a ratio of at least 80 parts of said powder per 20 parts of said liquid medium until each drop and a portion of the associated magnesia or magnesium hydroxide react to form a porous grain or pellet; and
   (c) separating the grains or pellets so formed from the unreacted powder,
      (1) all parts being by weight.
2. A method as set forth in claim 1, wherein said grains or pellets are mixed with an amount of water sufficient to permit the grains or pellets to be formed into a shape retaining body, and said body is fired until substantially free from volatile material.
3. A method as set forth in claim 1, wherein said grains and pellets are mixed with an amount of water and an amount of particulate refractory filler material, the amount of said grains and pellets being sufficient to hold said filler material in a shape retaining body after subsequent firing, and the amount of water being sufficient to permit the mixture of grains and pellets and of said filler to be formed into a shape retaining green body, and wherein said green body is fired until substantially free from volatile material.
4. A method of producing a magnesia bearing solid body which comprises:
   (a) mixing a powder essentially consisting of magnesium oxide or magnesium hydroxide with a liquid medium containing at least 70 percent by weight glacial acetic acid, the remainder essentially consisting of water,
      (1) the amount of said medium being sufficient to form a paste or slurry with said powder; and
   (b) permitting the mixture so produced to set while contained in a mold.
5. A method as set forth in claim 4, wherein an expanding agent is added to said mixture prior to the setting thereof, and caused to expand the mixture.

References Cited

UNITED STATES PATENTS

| | | | |
|---|---|---|---|
| 2,235,881 | 3/1941 | France | 106—40 |
| 2,318,754 | 5/1943 | Cavadino | 106—87 |
| 2,478,593 | 8/1949 | Pike | 23—201 |
| 2,662,825 | 12/1953 | Kauffmann et al. | 106—40 |
| 2,706,844 | 4/1955 | Nicholson | 106—40X |
| 2,797,201 | 6/1957 | Veatch et al. | 106—40UX |
| 3,095,312 | 6/1963 | Holmes | 106—40X |
| 3,275,420 | 9/1966 | Tchouriline-Kissileff | 23—313 |
| 3,421,914 | 1/1969 | Hare | 106—40 |

OTHER REFERENCES

Turner, F. M.; Condensed Chemical Dictionary, New York (Reinhold), 1950, pp. 5 and 637–638.

Latimer, W. M., et al.; Reference Book of Inorganic Chemistry, New York (McMillan), 1951, p. 53.

JAMES E. POER, Prmary Examiner

W. R. SATTERFIELD, Assistant Examiner

U.S. Cl. X.R.

23—313; 106—58, 87, 121; 159—48; 264—13, 42